United States Patent
Yang

(10) Patent No.: US 7,400,871 B2
(45) Date of Patent: Jul. 15, 2008

(54) MULTI-ANTENNA RECEIVING AND PROCESSING CIRCUIT ASSEMBLY

(75) Inventor: Ming-Lung Yang, Hong Kong (CN)

(73) Assignee: Seikaku Technical Group Limited, Hong Kong (CN)

( * ) Notice: Subject to any disclaimer, the term of this patent is extended or adjusted under 35 U.S.C. 154(b) by 438 days.

(21) Appl. No.: 11/144,638

(22) Filed: Jun. 6, 2005

(65) Prior Publication Data

US 2006/0141959 A1 Jun. 29, 2006

(30) Foreign Application Priority Data

Dec. 28, 2004 (CN) .................. 2004 2 0055986 U

(51) Int. Cl.
*H04B 7/00* (2006.01)

(52) U.S. Cl. ............... 455/273; 455/272; 455/334; 455/575.7; 455/132; 343/852; 343/814; 343/816

(58) Field of Classification Search ........... 455/272, 455/273, 275, 276.1, 277.1, 132, 550.1, 575.1, 455/425, 426, 561, 456.5, 456.6, 63.1, 67.13, 455/562.1, 575.7, 137, 296, 312, 334, 337; 330/301, 251, 151, 295; 375/347, 148, 267, 375/330, 324, 346, 349; 333/32, 17.3, 120, 333/124; 343/852, 814, 816, 704, 711–713
See application file for complete search history.

(56) References Cited

U.S. PATENT DOCUMENTS

| | | | | |
|---|---|---|---|---|
| 4,450,585 A | * | 5/1984 | Bell ........................... 455/135 |
| 5,448,602 A | * | 9/1995 | Ohmori et al. ............... 375/347 |
| 5,585,805 A | * | 12/1996 | Takenaka et al. ............ 342/461 |
| 6,038,429 A | * | 3/2000 | Ahn ............................ 455/72 |
| 6,054,906 A | * | 4/2000 | Kim ........................... 333/124 |
| 6,326,845 B1 | * | 12/2001 | Miyaji et al. ................ 330/151 |
| 6,351,124 B1 | * | 2/2002 | Vester et al. ................ 324/318 |
| 6,356,765 B1 | * | 3/2002 | McCrank et al. ............ 455/465 |
| 6,424,817 B1 | * | 7/2002 | Hadden et al. ............. 455/3.02 |
| 6,525,600 B1 | * | 2/2003 | Musiol et al. ............... 327/553 |
| 6,577,603 B1 | * | 6/2003 | Hakalin et al. .............. 370/252 |
| 6,625,202 B1 | * | 9/2003 | Sudo et al. .................. 375/147 |
| 6,678,512 B1 | * | 1/2004 | Kaminski et al. ........... 455/334 |
| 6,954,623 B2 | * | 10/2005 | Chang et al. ............. 455/127.1 |
| 7,193,472 B2 | * | 3/2007 | Gotou et al. ................ 330/295 |
| 7,203,470 B2 | * | 4/2007 | Seo ............................ 455/139 |
| 2003/0026365 A1 | * | 2/2003 | Ho et al. ..................... 375/347 |
| 2004/0027199 A1 | * | 2/2004 | Wight et al. ................ 330/251 |
| 2004/0198238 A1 | * | 10/2004 | Kato et al. .................... 455/82 |
| 2004/0209652 A1 | * | 10/2004 | Doi ............................ 455/561 |
| 2005/0083133 A1 | * | 4/2005 | Amano ....................... 330/301 |
| 2006/0050773 A1 | * | 3/2006 | Yano .......................... 375/148 |
| 2006/0205369 A1 | * | 9/2006 | Schaich et al. .............. 455/132 |

* cited by examiner

*Primary Examiner*—Edward F. Urban
*Assistant Examiner*—Charles Chow
(74) *Attorney, Agent, or Firm*—Bacon & Thomas, PLLC

(57) ABSTRACT

A multi-antenna receiving and processing circuit assembly is disclosed to include multiple antennas for receiving wireless signals, multiple pre-processing units respectively electrically connected to the antennas, a matching circuit electrically connected to the pre-processing units for matching signals from the pre-processing units into a matching signal, a post-processing unit electrically connected to the matching circuit for processing the matching signal from the matching circuit through a single intermediate frequency signal and into a plurality of audio frequency signals respective to each antenna, and an output circuit electrically connected to the post-processing unit for outputting the audio frequency signals to external audio output devices.

6 Claims, 2 Drawing Sheets

MULTI-ANTENNA RECEIVING AND PROCESSING CIRCUIT ASSEMBLY

BACKGROUND OF THE INVENTION

1. Field of the Invention

The present invention relates generally to audio signal processing and more specifically, to a multi-antenna receiving and processing circuit assembly.

2. Description of the Related Art

There are known wireless transmission devices that use multiple antennas to receive different signals. However, these conventional wireless transmission devices commonly use two independent processing circuits to convert different input signals into different audio signals for output. Because two independent processing circuits are used, the circuit design of the aforesaid conventional wireless transmission devices is complicated, resulting in a high manufacturing cost and big device size.

SUMMARY OF THE INVENTION

The present invention has been accomplished under the circumstances in view. It is the main object of the present invention to provide a multi-antenna receiving and processing circuit assembly, which can receive multiple signals and process the signals into a matching signal through a specially processing flow. It is another object of the present invention to provide a multi-antenna receiving and processing circuit assembly, which uses less number of component parts, thereby simplifying the circuit design and reducing the circuit size.

To achieve these and other objects of the present invention, the multi-antenna receiving and processing circuit assembly comprises a plurality of antennas for receiving wireless signals; a plurality of pre-processing units respectively electrically connected to the antennas; a matching circuit electrically connected to the pre-processing units and adapted to match signals from the pre-processing units into a matching signal; a post-processing unit electrically connected to the matching circuit and adapted to process the matching signal from the matching circuit through a single intermediate frequency signal and into a plurality of audio frequency signals respective to each antenna; and an output circuit electrically connected to the post-processing unit for outputting the audio frequency signals to external audio output means.

DETAILED DESCRIPTION OF THE INVENTION

Figure 1:
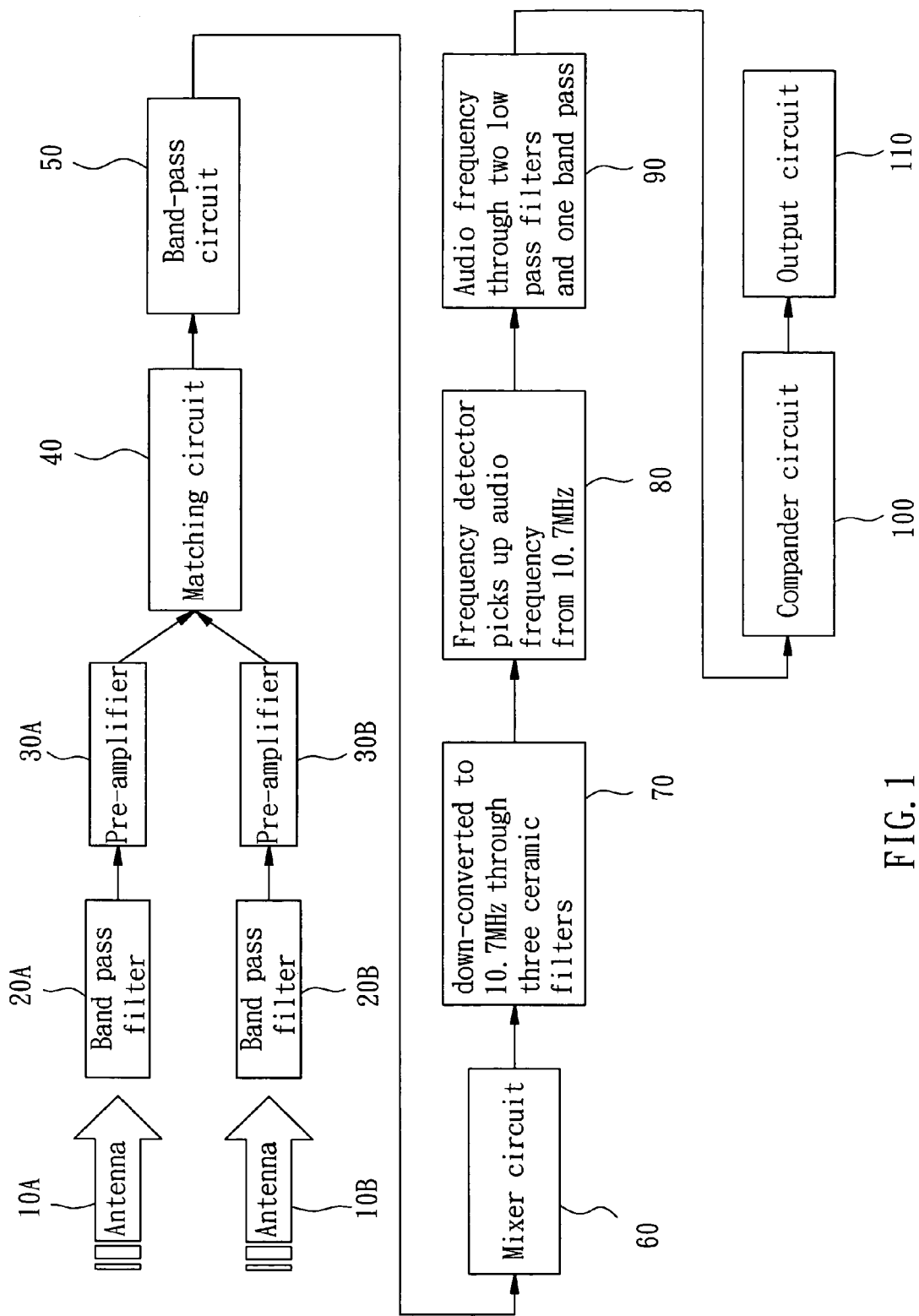
FIG. 1 is a block diagram of a multi-antenna receiving and processing circuit assembly according to the present invention.

Referring to FIG. 1, a multi-antenna receiving and processing circuit assembly in accordance with the present invention is shown comprising:

a first antenna 10A and a second antenna 10B for receiving different wireless signals or same wireless signal;

two band pass filters 20A;20B respectively formed of three inductors and three capacitors and respectively connected to the first antenna 10A and the second antenna 10B for removing noises;

two pre-amplifiers 30A;30B respectively connected to the band pass filters 20A;20B to amplify signal and forming with the band pass filters 20A;20B a respective pre-processing unit;

a matching circuit 40 adapted to receive signals outputted from the pre-amplifiers 30A;30B and to match the signals into a matching signal (see FIG. 2 for the detailed circuit diagram), the matching circuit 40 having connected thereto at each circuit a capacitor, a capacity ground at the front side of the capacitor, two inductors connected in series at the rear side of the capacitor, a resistor connected between the inductors, and a capacitor connected to the ends of the resistor;

a band-pass circuit 50 connected to the matching circuit 40 and adapted to fetch the set frequency signal;

a mixer circuit 60 connected to the band-pass circuit 50 for frequency mixing of amplifying circuit and band-pass circuit;

a down-converter 70 comprised of three ceramic filters and connected to the mixer circuit 60 for converting input signal into a single intermediate frequency signal about 10.7 MHz;

an intermediate frequency processor 80 connected to the down-converter 70 and adapted to pick up the audio frequency from input signal by means of a frequency detector;

a low frequency processor 90 comprised of two low pass filters and one band pass and connected to the intermediate frequency processor 80 for removing noises and forming with the intermediate frequency processor 80 a frequency processing unit;

an compander circuit 100 connected to the low frequency processor 90 and adapted to compress and expand the audio frequency; and an output circuit 110 connected to the compander circuit 100 for outputting audio frequency signal to audio output devices.

In the aforesaid multi-antenna output processing device, the series circuit of the band-pass circuit 50, mixer circuit 60, down-converter 70, intermediate frequency processor 80, low frequency processor 90 and compander circuit 100 forms a post-processing unit.

Figure 2:
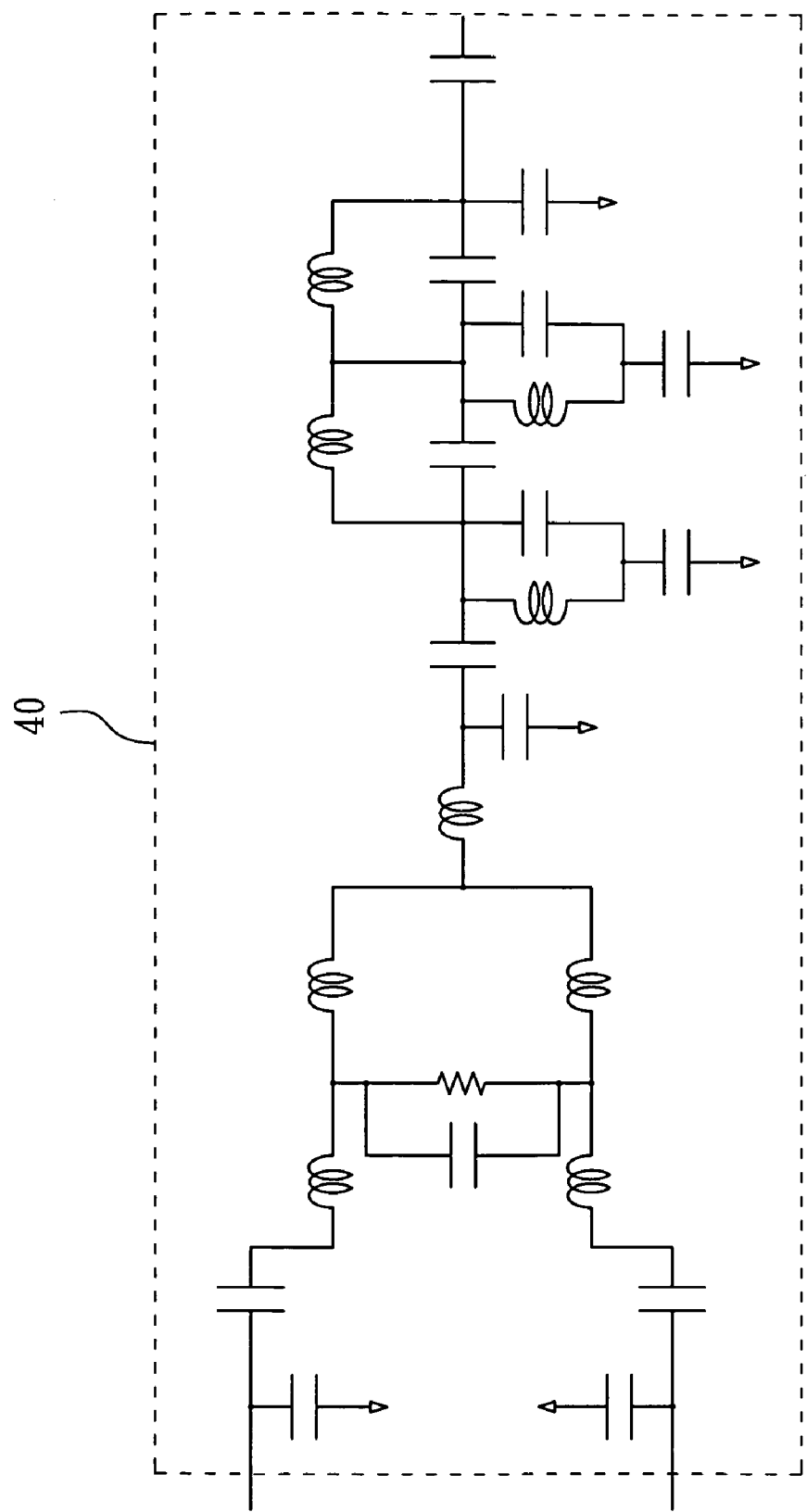
FIG. 2 is a circuit diagram of the matching circuit of the multi-antenna receiving and processing circuit assembly according to the present invention.

The action of the invention and its principle are explained hereinafter:

As shown in FIG. 2, the key point of the present invention is at the matching circuit 40, which effectively processes and matches two signals, enabling two audio signals to be outputted through a single intermediate frequency and into two audio frequencies for further processing through one common post-processing unit.

As indicated above, the invention has the following features:

1. The multi-antenna receiving and processing circuit assembly can receive multiple signals and process the signals into a matching signal through a specially processing flow.

2. The multi-antenna receiving and processing circuit assembly of the present invention uses less number of component parts, thereby simplifying the circuit design and reducing the circuit size.

What is claimed is:

1. A multi-antenna receiving and processing circuit assembly comprising:

a plurality of antennas for receiving wireless signals;

a plurality of pre-processing units respectively electrically connected to said antennas;

a matching circuit electrically connected to said pre-processing units and adapted to match signals from said pre-processing units into a matching signal, wherein a connection of the matching circuit to the pre-processing units includes a capacitor connected to each of the pre-processing units, a capacity ground at a front side of each said capacitor, and two inductors connected in series at a rear side of each said capacitor, said connection further including a resistor connected between said inductors, and a capacitor connected to two ends of said resistor;

a post-processing unit electrically connected to said matching circuit and adapted to process said matching signal from said matching circuit through a single intermediate frequency signal and then a plurality of audio frequency signals respective to each antenna; and an output circuit electrically connected to said post-processing unit for outputting said audio frequency signals to external audio output means.

2. The multi-antenna receiving and processing circuit assembly as claimed in claim 1, wherein each said pre-processing unit comprises a band pass filter electrically connected to the respective antenna, and a pre-amplifier electrically connected to said band pass filter.

3. The multi-antenna receiving and processing circuit assembly as claimed in claim 2, wherein said band pass filter is comprised of a plurality of inductors and capacitors.

4. The multi-antenna receiving and processing circuit as claimed in claim 1, wherein said post-processing unit comprises:

a band-pass circuit electrically connected to said matching circuit;

a mixer circuit electrically connected to said band-pass circuit;

a down-converter electrically connected to said mixer circuit;

a frequency processing unit electrically connected to said down-converter; and a compander circuit electrically connected to said frequency processing unit.

5. The multi-antenna receiving and processing circuit as claimed in claim 4, wherein said frequency processing unit comprises an intermediate frequency processor, and a low frequency processor electrically connected to said intermediate frequency processor.

6. The multi-antenna receiving and processing circuit as claimed in claim 4, wherein said down-converter is comprised of a plurality of ceramic filters.

* * * * *